United States Patent
Mieda et al.

(10) Patent No.: US 12,068,088 B2
(45) Date of Patent: Aug. 20, 2024

(54) POWER CABLE, AND METHOD FOR MANUFACTURING POWER CABLE

(71) Applicant: FURUKAWA ELECTRIC CO., LTD., Tokyo (JP)

(72) Inventors: Tetsuya Mieda, Tokyo (JP); Kazuyoshi Akizuki, Tokyo (JP); Shingo Mitsugi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 95 days.

(21) Appl. No.: 17/931,378

(22) Filed: Sep. 12, 2022

(65) Prior Publication Data

US 2023/0017246 A1 Jan. 19, 2023

Related U.S. Application Data

(63) Continuation of application No. PCT/JP2021/013517, filed on Mar. 30, 2021.

(30) Foreign Application Priority Data

Mar. 30, 2020 (JP) .................................. 2020-060117

(51) Int. Cl.
*H01B 3/30* (2006.01)
*H01B 9/02* (2006.01)
(Continued)

(52) U.S. Cl.
CPC ............... *H01B 13/14* (2013.01); *H01B 3/30* (2013.01); *H01B 9/02* (2013.01); *H01B 13/0016* (2013.01)

(58) Field of Classification Search
CPC . H01B 1/24; H01B 3/44; H01B 3/307; H01B 3/441; H01B 19/04; C08L 3/013;
(Continued)

(56) References Cited

U.S. PATENT DOCUMENTS 3,643,004 A * 2/1972 McKean ................ H01B 9/027
174/110 B
4,150,082 A 4/1979 Brick et al.
(Continued)

FOREIGN PATENT DOCUMENTS

EP  2656356 A1  10/2013
JP  S 57-9009 A  1/1982
(Continued)

OTHER PUBLICATIONS

WIPO, Japanese International Search Authority, International Search Report (with English translation) and Written Opinion mailed Jun. 29, 2021 in International Patent Application No. PCT/JP2021/013517, 8 pages.
(Continued)

*Primary Examiner* — William H. Mayo, III
(74) *Attorney, Agent, or Firm* — MASUVALLEY & PARTNERS; Peter Martinez

(57) ABSTRACT

Provided is a power cable and a method for manufacturing a power cable that reduces occurrence of uneven thickness of an insulating layer and voids and peeling due to shrinkage and has good dielectric breakdown strength. The power cable includes the insulating layer containing 15 mass % or more of a propylene-based resin having a melting point of 110° C. or higher with respect to a whole. The power cable further includes a relationship between a cooling rate X [° C./min] at the time of manufacturing an interface portion in the insulating layer with the inner semiconductive layer and a cooling rate Y [° C./min] at the time of manufacturing a central portion of the insulating layer and is expressed by the relationship (Z), wherein X≥Y×0.8 . . . (Z).

9 Claims, 2 Drawing Sheets

(51) Int. Cl.
*H01B 13/00* (2006.01)
*H01B 13/14* (2006.01)

(58) Field of Classification Search
CPC ...... C08L 3/22; C08L 3/04; C08L 3/36; C08L 9/06; C08L 23/08; C08L 33/02; C08L 31/04; C08L 5/13; C08L 5/36
USPC .......... 174/110 R–121 R; 524/330, 515, 523, 524/392, 524
See application file for complete search history.

(56) References Cited

U.S. PATENT DOCUMENTS

| | | | |
|---|---|---|---|
| 2004/0038030 A1 | 2/2004 | Castellani et al. | |
| 2008/0050588 A1* | 2/2008 | Broman | C08L 23/0815 252/500 |
| 2008/0262136 A1* | 10/2008 | Akermark | H01B 3/446 524/323 |
| 2013/0175068 A1* | 7/2013 | Sutton | H01B 3/307 174/110 SR |
| 2013/0313000 A1* | 11/2013 | Nilsson | C08K 5/375 174/120 SR |
| 2015/0087787 A1 | 3/2015 | Sutton et al. | |
| 2016/0194489 A1* | 7/2016 | Ho | H01B 3/441 252/511 |
| 2020/0273598 A1* | 8/2020 | Hosomizu | C08K 3/36 |
| 2020/0303093 A1* | 9/2020 | Cantz | H01R 9/11 |

FOREIGN PATENT DOCUMENTS

| | | |
|---|---|---|
| JP | 4875282 B2 | 2/2012 |
| JP | 2014-500335 A | 1/2014 |
| JP | 6189927 B2 | 8/2017 |
| WO | WO 2012/084055 A1 | 6/2012 |
| WO | WO 2013/148028 A1 | 10/2013 |

OTHER PUBLICATIONS

WIPO, Japanese International Search Authority, Written Opinion mailed Jun. 29, 2021 in International Patent Application No. PCT/JP2021/013517 with English translation, total 6 pages.

European Patent Office, The extended European search report issued on Feb. 8, 2024 for European patent application No. 21779748.9, 7 pages.

* cited by examiner

POWER CABLE, AND METHOD FOR MANUFACTURING POWER CABLE

RELATED APPLICATIONS

This application is continuation of and claims priority to International Patent Patent Application No. PCT/JP2021/013517, International Filing Date Mar. 30, 2021, entitled Power Cable, And Method For Manufacturing Power Cable, which claims priority to Japanese Application No. JP2020-060117 filed Mar. 30, 2020 entitled Power Cable, And Method For Manufacturing Power Cable, both of which are hereby incorporated herein by reference in their entireties.

TECHNICAL FIELD

The present invention relates to a power cable and a method for manufacturing a power cable. More specifically, the present invention relates to a power cable and a method for manufacturing a power cable having a structure in which an inner semiconductive layer, an insulating layer, and an outer semiconductive layer are applied and laminated in this order on the outer periphery of a metal conductor by extrusion.

BACKGROUND ART

In general, a power cable is obtained by coating the outer periphery of a metal conductor with an inner semiconductive layer, an insulating layer, and an outer semiconductive layer in this order by extrusion. Conventionally, cross-linked polyethylene has been used as an insulating layer of such a power cable.

However, since cross-linked polyethylene has a melting point ($T_m$) around 110° C., when a large current is conducted, deformation of the insulating layer occurs due to heat generation, which may cause electrical breakdown (dielectric breakdown) of the insulating layer. In order to prevent such electrical breakdown, it is necessary to suppress the amount of electricity to a certain value or less or to design the cross-sectional area of the metal conductor of the power cable to be large.

In order to cope with such a problem, resin compositions constituting the insulating layer have been studied. For example, resin compositions of a propylene homopolymer, a copolymer of ethylene and propylene, or a copolymer of α-olefin excluding propylene and propylene and a dielectric liquid have been studied as insulating resin compositions capable of achieving an operating temperature of 90° C. or higher, which is higher than 70° C. as an operating temperature of a polyethylene-based insulator (for example, see Patent Literature 1).

In addition, as another example, in a method for manufacturing a polymer composition including a control-cooling-heating mixed system of polypropylene and a propylene-α-olefinic copolymer, a manufacturing method for obtaining high dielectric strength by combining uncontrolled cooling and controlled cooling of an insulator has been studied (for example, see Patent Literature 2).

CITATION LIST

Patent Literature

Patent Literature 1: JP 4875282 B2
Patent Literature 2: JP 6189927 B2

SUMMARY OF INVENTION

Technical Problem

Here, the insulating layer using a resin composition containing a propylene-based resin is formed by melting the resin composition, extruding the melted resin composition onto a metal conductor, and cooling the extruded resin composition to a crystallization temperature or lower by air cooling or water cooling (liquid cooling).

Meanwhile, since the insulating layer of a high-voltage power cable has a thickness of several tens of millimeters, the temperature difference between the surface of the insulating layer (the surface on the outer semiconductive layer side) and the inside of the insulating layer may be several tens ° C. Therefore, in a case where cooling and solidification of each layer is performed by external cooling for cooling from the outside of the cable, the inside of the insulating layer is not solidified and is soft even when the surface of the insulating layer is solidified. Thus, there is a problem that the metal conductor is displaced from the center of the cable by its own weight, and a defect called uneven thickness occurs.

In a case where the metal conductor is displaced from the center of the cable and uneven thickness occurs, a portion where the insulating layer is thin is generated, so that the dielectric breakdown strength decreases. In addition, occurrence of voids and peeling due to shrinkage caused by cooling shrinkage from the cable surface also leads to a decrease in dielectric breakdown strength, and these occur in the vicinity of the conductor finally solidified or at the interface between different materials. However, the above-described techniques cannot sufficiently solve these problems.

The present invention has been made in view of the above problems, and an object of the present invention is to provide a power cable and a method for manufacturing a power cable that reduce occurrence of uneven thickness of an insulating layer and voids and peeling due to shrinkage, and have good dielectric breakdown strength.

Solution to Problem

In order to solve the above problems, a power cable according to the present invention has a structure in which an inner semiconductive layer, an insulating layer, and an outer semiconductive layer are laminated in this order on an outer periphery of a metal conductor, wherein
the insulating layer contains 15 mass % or more of a propylene-based resin having a melting point of 110° C. or higher with respect to a whole, and a relationship between a cooling rate X [° C./min] at a time of manufacturing an interface portion in the insulating layer with the inner semiconductive layer and a cooling rate Y [° C./min] at a time of manufacturing a central portion of the insulating layer is expressed by a following relationship (Z):

$$X \geq Y \times 0.8 \qquad (Z)$$

In the power cable according to the present invention, the propylene-based resin is obtained by multi-stage gas phase polymerization in the above-described present invention.

In the power cable according to the present invention, the propylene-based resin is a thermoplastic olefinic elastomer in the above-described present invention.

In the power cable according to the present invention, in the above-described present invention, the insulating layer contains a thermoplastic resin having a melting point of less than 110° C. in a range of more than 0 to 75 mass % or less with respect to the entire insulating layer.

In the power cable according to the present invention, in the above-described present invention, a relationship between a cooling rate and a shoulder peak temperature is obtained from the shoulder peak temperature [° C.] measured on a low temperature side at a melting peak observed in a heating process and the cooling rate [° C./min] in cooling after the heating process by using differential scanning calorimetry (DSC) for a target sample collected from a corresponding portion, and the cooling rate X and the cooling rate Y are confirmed by the relationship.

In the power cable according to the present invention, the cooling rate Y is 0.1 to 30° C./min in the above-described present invention.

In the power cable according to the present invention, a thickness of the insulating layer is 5 mm or more in the above-described present invention.

A method for manufacturing a power cable according to the present invention is a method for manufacturing a power cable having a structure in which an inner semiconductive layer, an insulating layer, and an outer semiconductive layer are applied and laminated in this order on an outer periphery of a metal conductor by extrusion, wherein the insulating layer contains 15 mass % or more of a propylene-based resin having a melting point of 110° C. or higher with respect to a whole, and the insulating layer is formed such that a relationship between a cooling rate X [° C./min] at a time of manufacturing an interface portion in the insulating layer with the inner semiconductive layer and a cooling rate Y [° C./min] at a time of manufacturing a central portion of the insulating layer is expressed by a following relationship (Z):

$$X \geq Y \times 0.8 \tag{Z}$$

In the method for manufacturing a power cable according to the present invention, in the above-described present invention, a relationship between a cooling rate and a shoulder peak temperature is obtained from the shoulder peak temperature [° C.] measured on a low temperature side at a melting peak observed in a heating process and the cooling rate [° C./min] in cooling after the heating process by using differential scanning calorimetry (DSC) for a target sample collected from a corresponding portion, and the cooling rate X and the cooling rate Y are confirmed by the relationship.

Advantageous Effects of Invention

The power cable according to the present invention contains a propylene-based resin in a specific range as the insulating layer, and has a specific relationship between the cooling rate X at the time of manufacturing the interface portion in the insulating layer with the inner semiconductive layer and the cooling rate Y at the time of manufacturing the central portion of the insulating layer. Thus, not only the surface of the insulating layer but also the inside of the insulating layer, the interface portion in the insulating layer with the inner semiconductive layer, and the inside thereof are reliably cooled and cured. Therefore, the metal conductor is not displaced from the center of the power cable due to its own weight, and uneven thickness is less likely to occur. In addition, distortion of cooling shrinkage is dispersed, so that occurrence of voids due to shrinkage is suppressed, and the power cable having good dielectric breakdown strength is obtained.

In addition, the method for manufacturing a power cable according to the present invention can provide a power cable having the above effects.

DESCRIPTION OF EMBODIMENTS (I) Structure of Power Cable 1

Figure 1:
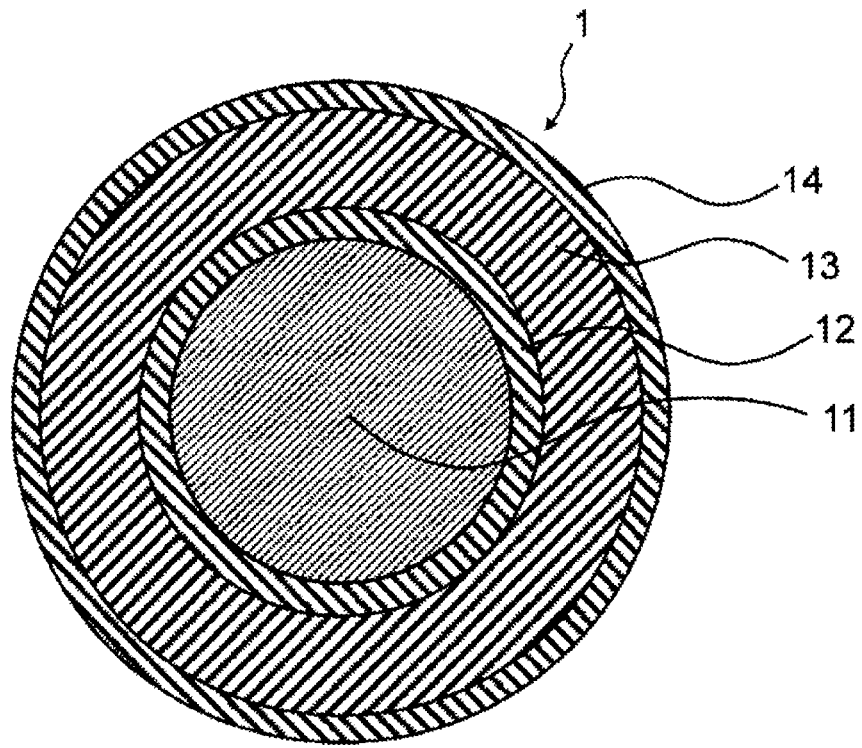
FIG. 1 is a cross-sectional view illustrating an example of a power cable according to the present invention.

Hereinafter, one aspect of the present invention will be described. FIG. 1 is a cross-sectional view illustrating an example of a power cable 1 according to the present invention. Note that, in FIG. 1, reference numeral 1 denotes a power cable, reference numeral 11 denotes a metal conductor, reference numeral 12 denotes an inner semiconductive layer, reference numeral 13 denotes an insulating layer, and reference numeral 14 denotes an outer semiconductive layer. In addition, although a solid wire having a circular cross section is described as the metal conductor 11, this is an example, and the metal conductor 11 includes those constituted by stranded wires or the like as described later.

As illustrated in FIG. 1, the power cable 1 according to the present invention has a structure in which the inner semiconductive layer 12, the insulating layer 13, and the outer semiconductive layer 14 are laminated in this order on the outer periphery of the metal conductor 11. Hereinafter, each layer and the like will be described.

(Metal Conductor 11)

As a constituent material of the metal conductor 11, a metal material such as copper, a copper alloy, aluminum, or an aluminum alloy can be used. The cross-sectional shape of the metal conductor 11 is a circular shape, a rectangular shape, or the like. In general, it is preferable to use copper or aluminum as the constituent material of the metal conductor 11 and a circular shape as the shape.

Note that a metal conductor formed by plating a surface of the metal conductor 11 made of the above-described metal material with tin, silver, or the like may be used as the metal conductor 11. In addition, as the metal conductor 11, either a solid wire or a stranded wire can be used.

The cross-sectional area and the shape of the metal conductor 11 are not particularly limited, and can be appropriately determined according to the voltage class or the laying conditions of the power cable 1, but the cross-sectional area of the metal conductor 11 is preferably 60 to 5000 mm2, and particularly preferably 100 to 3500 mm2. In the case of a solid wire having a circular cross section, the outer diameter is preferably 10 to 40 mm.

In the case of a stranded wire, a configuration or shape used in a normal power cable 1 is preferable as the configuration of the metal conductor 11, and as the number of strands/strand diameter, for example, a configuration of 7 wires/0.6 mm, 7 wires/0.8 mm, 7 wires/1.0 mm, 7 wires/1.2 mm, 19 wires/2.6 mm, or the like may be used. In addition, the number of strands/strand diameter of the configuration described in hard-drawn copper stranded conductors of JIS C 3105, annealed copper wires of JIS C 3102, or the like may be used.

(Insulating Layer 13)

In the present invention, examples of the resin constituting the insulating layer 13 include a propylene-based resin having a melting point of 110° C. or higher (which may be simply referred to as a "propylene-based resin" hereinafter). The propylene-based resin refers to a resin or a resin composition containing a propylene component, and is not particularly limited. Examples of polypropylene include homopolypropylene, random polypropylene, block polypropylene, and atactic polypropylene. In addition, examples of the propylene-based resin include a propylene polymer (the above-described polypropylene, a random copolymer of propylene and, for example, 5 mass % or less of α-olefin other than propylene, and the like).

Examples of the random polypropylene include a resin composed of a random copolymer of α-olefin (preferably olefin having two to four carbon atoms) and propylene, and examples of the block polypropylene include a composition containing homopolypropylene and an ethylene-α-olefin (for example, ethylene-propylene) copolymer. Examples of the propylene-based resin also include a propylene polymer (for example, a propylene-α-olefin copolymer, maleic anhydride-modified polypropylene, and the like).

In addition, in the present invention, as the propylene-based resin having a melting point of 110° C. or higher, it is preferable to use a resin obtained by multi-stage gas phase polymerization, which is also generally referred to as a thermoplastic olefinic elastomer. A resin obtained by multi-stage gas phase polymerization is known as a resin material that improves impact strength (particularly, for example, impact strength at low temperature) while maintaining rigidity and heat resistance of polypropylene, and is also suitable as a constituent material of the insulating layer 13 of the power cable 1.

(Propylene-based) resins obtained by multi-stage gas phase polymerization are generally referred to as heterophasic copolymers, impact copolymers, reactor-made alloys, reactor-made thermoplastic elastomers, or reactor thermoplastic olefinic elastomers (TPO), and reactor thermoplastic olefinic elastomers (TPO) are common.

Such a resin is a resin composition containing a crystalline propylene polymer (polypropylene, a crystalline random copolymer of propylene and, for example, 5 mass % or less of α-olefin other than propylene, and the like) and an ethylene-α-olefin copolymer rubber (or a propylene-α-olefin copolymer rubber), and generally refers to a resin composition having a high content of the ethylene-α-olefin copolymer rubber. The ethylene-α-olefin copolymer is sometimes described as an example below.

The content of the propylene polymer and the ethylene-α-olefin copolymer rubber is preferably 20 to 70 mass % of the propylene polymer and 30 to 80 mass % of the ethylene-α-olefin copolymer rubber from the viewpoint of heat resistance and flexibility. Examples of the ethylene-α-olefin copolymer rubber contained in the propylene-based resin (reactor TPO, thermoplastic olefinic elastomer) obtained by the multi-stage gas phase polymerization include an ethylene-propylene copolymer rubber, an ethylene-butene copolymer rubber, an ethylene-hexene copolymer rubber, and an ethylene-octene copolymer rubber. Examples of the propylene-α-olefin copolymer rubber include, in addition to the above-described ethylene-propylene copolymer rubber, a propylene-butene copolymer rubber, a propylene-hexene copolymer rubber, and a propylene-octene copolymer rubber.

In general, manufacturing of a heterophasic copolymer by multi-stage gas phase polymerization requires at least two reactors, and includes, for example, a polymerization step including a first step of manufacturing a homopolymer of propylene (polypropylene) or a crystalline random copolymer of propylene and 5 mass % or less of α-olefin other than propylene (the propylene polymer above), and second and subsequent steps of manufacturing a random copolymer elastomer (copolymer rubber, rubber-like copolymer, and the like) of an ethylene-α-olefin represented by ethylene, butene, or the like (or a propylene-α-olefin copolymer). A propylene polymer having relatively high crystallinity is manufactured in the first step, and subsequently a polymer rubber with an ethylene-α-olefin (or a propylene-α-olefin copolymer) is manufactured in the second step to obtain a heterophasic copolymer.

Examples of reaction catalysts used in performing the multi-stage gas phase polymerization include a conventionally known Ziegler-Natta catalyst and a metallocene catalyst. In addition, examples of monomers used in performing the multi-stage gas phase polymerization include monomers of propylene and α-olefin such as ethylene and butene.

In the resin obtained by the multi-stage gas phase polymerization, fine powder resin components generated in each stage are blended in a reactor during polymerization. By melt-kneading the mixture, a resin having a micro phase-separated structure having a finer sea of a propylene polymer component such as polypropylene and an island of an elastomer component (copolymer rubber component) is obtained as compared with a conventional method in which pellets of polypropylene and elastomer are blended and melt-kneaded. The average particle size of the elastomer component used in the present invention is preferably 5 μm or less, and particularly preferably 1 μm or less.

Examples of commercially available products of the propylene-based resin obtained by the multi-stage gas phase polymerization include a series of resins called Catalloy process resins, for example, a product group of Adflex, Hifax, Softell, Adsyl (the above are registered trademarks) (the above are manufactured by LyondellBasell Industries N.V.). In addition, a product group such as TAFMER (registered trademark) PN (manufactured by Mitsui Chemicals, Inc.), Tafthren (registered trademark) (manufactured by Sumitomo Chemical Company, Limited), NEWCON (registered trademark) (manufactured by Japan Polypropylene Corporation), and PRIME TPO (registered trademark) (manufactured by Prime Polymer Co., Ltd.) is also suitably used.

In addition, the propylene-based resin having a melting point of 110° C. or higher also includes a resin composition obtained by mixing a propylene polymer (the above-described polypropylene, a random copolymer of propylene and, for example, 5 mass % or less of α-olefin other than propylene, and the like) with at least one selected from an ethylene-α-olefin copolymer and a propylene-α-olefin copolymer, melt-kneading the mixture until an island having a diameter of, for example, 5 μm or less is formed, and finely dispersing the mixture such that an island component of an ethylene-α-olefin copolymer or the like is formed in a sea component of the propylene polymer.

The propylene-based resin used for the insulating layer 13 preferably has moderate melt fluidity, and the fluidity can be expressed as a melt flow rate (MFR) (230° C./2.16 kgf) defined by ISO 1133 (JIS K 7210). From the viewpoint of productivity of extrusion, the MFR is preferably 0.1 g/10 min or more, and more preferably 0.5 g/10 min or more. In addition, from the viewpoint of suppressing uneven thickness, the MFR is preferably 10 g/10 min or less, and more preferably 5 g/10 min or less.

The propylene-based resin constituting the insulating layer 13 and having a melting point of 110° C. or higher is contained in an amount of 15 mass % or more with respect to the entire insulating layer 13. When the propylene-based resin is contained in an amount of 15 mass % or more with respect to the entire insulating layer 13, the resin can withstand heat generation due to a large current. The propylene-based resin is preferably 15 to 100 mass %, and particularly preferably 20 to 100 mass % with respect to the entire insulating layer 13.

Note that, in a case where another resin such as a thermoplastic resin having a melting point of lower than 110° C., which will be described later, is added to the insulating layer 13, the content of the propylene-based resin is preferably 20 to 99 mass %, and particularly preferably 25 to 99 mass % with respect to the entire insulating layer 13.

In addition, the thickness of the insulating layer 13 is preferably 2 mm or more, more preferably 5 mm or more, and particularly preferably 10 mm or more from the viewpoint of insulation characteristics. In addition, from the viewpoint of laying workability, the thickness is preferably 50 mm or less, and particularly preferably 40 mm or less.

As the resin that can be used other than the propylene-based resin as the resin constituting the insulating layer 13, a conventionally known thermoplastic resin that is used as an insulating layer 13 of a power cable 1, such as an ethylene-α-olefin copolymer or a polyolefin resin such as polyethylene, can be used.

In order to reduce the elasticity of the insulating layer 13, improve the low temperature embrittlement resistance, and the like, a thermoplastic resin having a melting point of less than 110° C. can be blended as an optional component. As such a thermoplastic resin, for example, a styrene plastic elastomer, an ethylene-α-olefin copolymer-based heating element (for example, an ethylene-butene copolymer or the like) manufactured by other than multi-stage gas phase polymerization, a propylene-α-olefin copolymer, or the like can be added, and the addition of these resins reduces the elasticity and improves the low temperature embrittlement resistance.

Examples of the thermoplastic styrenic elastomer include a hydrogenated thermoplastic styrenic elastomer, and, for example, a thermoplastic styrenic elastomer such as a (hydrogenated) styrene-butadiene rubber (HSBR), a (hydrogenated) styrene-ethylene-butylene-styrene block copolymer (SEBS), a (hydrogenated) styrene-ethylene-propylene-styrene-block copolymer (SEPS), a (hydrogenated) styrene-ethylene-ethylene-propylene-styrene block copolymer (SEEPS), a styrene-ethylene-butylene-olefin crystal block copolymer (SEBC), and a styrene-butadiene block copolymer (SBR), obtained by hydrogenating a styrene-butadiene block copolymer (SBR), a styrene-butadiene-styrene block copolymer (SBS), a styrene-isoprene-styrene block copolymer (SIS), a butadiene polymer block, and an isoprene polymer block. These thermoplastic styrenic elastomers may be used alone, or may be used in combination of two or more thereof.

In a case where these resins are added, they are contained preferably in a range of more than 0 to 80 mass % or less, and particularly preferably in a range of more than 0 to 75 mass % or less with respect to the entire insulating layer 13.

Note that, as an optional component for reducing the elasticity, for example, alkylated aromatics such as polyisobutene or linear alkylbenzene, or silicone oil can be added to the insulating layer 13 in a range of 0 to 10 mass % with respect to the entire insulating layer 13. In addition, as an optional component for improving the heat resistance, for example, an organic peroxide such as di-t-hexyl peroxide (PERHEXYL D manufactured by NOF CORPORATION), dicumyl peroxide (PERCUMYL D manufactured by NOF CORPORATION), 2,5-dimethyl-2,5-di (t-butylperoxy) hexane (PERHEXA 25B manufactured by NOF CORPORATION), α,α'-di (t-butylperoxy) diisopropylbenzene (PERBUTYL P manufactured by NOF CORPORATION), t-butylcumyl peroxide (PERBUTYL C manufactured by NOF CORPORATION), or di-t-butyl peroxide (PERBUTYL D manufactured by NOF CORPORATION) can be added in an amount of 0 to 5 mass % with respect to the entire insulating layer 13.

(Inner Semiconductive Layer 12 and Outer Semiconductive Layer 14)

The material constituting the inner semiconductive layer 12 and the outer semiconductive layer 14 (which may be referred to as "the inner semiconductive layer 12 and the like" hereinafter in this section) is not particularly limited, and a material generally used as an inner semiconductive layer 12 or the like in a power cable 1 can be used. Examples include a resin composition in which a thermoplastic resin such as a polyolefin-based resin is used as a base material and a conductive material or the like is added. In addition, a resin composition composed of these may be cross-linked. The blending amount of each component in the resin composition may be appropriately determined depending on the selected components, the purpose of blending, and the like.

The thermoplastic resin constituting the inner semiconductive layer 12 and the like is not particularly limited, but in the present invention, examples include a thermoplastic resin such as the propylene-based resin mentioned as the material constituting the insulating layer 13, an ethylene-based polymer such as an ethylene-vinyl acetate copolymer (EVA) and an ethylene-ethyl acrylate copolymer (EEA) excellent in dispersibility of conductive carbon, and other polyolefin-based resins. These resins may be used alone, or may be used in combination of two or more thereof. Among these thermoplastic resins, the propylene-based resin is preferably used.

As the conductive material, a conventionally known material may be used, and is not particularly limited, but in general, it is preferable to use conductive carbon. Examples of the conductive carbon include carbon black, acetylene black, furnace black, Ketjenblack, thermal black, and graphite. These materials may be used alone, or may be used in combination of two or more thereof. The conductive material is preferably blended in the inner semiconductive layer 12 and the like in a range of 20 to 100 mass parts with respect to 100 mass parts of the thermoplastic resin.

The thicknesses of the inner semiconductive layer 12 and the outer semiconductive layer 14 can be appropriately determined according to the voltage class, the laying conditions, and the like of the power cable 1, and are not particularly limited, but are preferably 0.1 mm or more, and more preferably 0.5 mm or more from the viewpoint of insulation characteristics. In addition, from the viewpoint of conductive characteristics, the thicknesses are preferably 5 mm or less, more preferably 3 mm or less, and still more preferably 2 mm or less.

Note that, as the materials constituting the inner semiconductive layer 12, the insulating layer 13, and the outer semiconductive layer 14, for example, an inorganic filler such as magnesium oxide, aluminum oxide, zirconium oxide, titanium oxide, magnesium hydroxide, aluminum hydroxide, silicon carbide, or mica, a plasticizer such as a fatty acid such as stearic acid or oleic acid or a metal salt thereof, a softener such as mineral oil, wax, or paraffin, an anti-aging agent such as an ester, an amide, or 4,4'-thiobis (3-methyl-6-tert-butylphenol), a hindered phenol antioxidant, a thioether antioxidant, a colorant, an antioxidant, an ultraviolet absorber, a lubricant, a stabilizer, a cross-linking agent, or the like, and other conventionally known additives added to a material constituting a power cable 1 may be added as necessary, as long as the effects exhibited by the present invention are not inhibited.

Note that, although not illustrated in FIG. 1, it is general to form a shielding layer or a sheath (outer sheath) described below around the power cable 1 having the above-described structure as a cable core.

(Shielding Layer)

Examples of the shielding layer include a tape-like or extruded metal. For example, copper tape, aluminum tape, aluminum, lead, stainless steel material (SUS) formed by being extruded to the outer periphery of the cable core, and the like are exemplified, and it is preferable to use a copper tape as the shielding layer. Note that a tape or the like made of rubberized cloth or the like may be wound inside or outside the shielding layer.

The thickness of the water shielding layer varies depending on the voltage class and the laying conditions of the power cable 1, and is not particularly limited, but the thickness of the water shielding layer is preferably 1 mm or less, and more preferably 0.05 to 0.5 mm, for example, in the case of a tape shape.

(Sheath (Outer Sheath))

The main purpose of the sheath is to protect the cable core including the insulating layer and to isolate it from moisture. The present invention includes functional layers such as an anticorrosion layer and a water shielding layer in addition to a simple sheath. Examples of the material constituting the sheath include a polyvinyl chloride (PVC) resin and a polyethylene resin.

The thickness of the sheath is not particularly limited, and can be appropriately determined according to the voltage class, the laying conditions, and the like of the power cable 1, but the thickness of the sheath is preferably 0.1 to 3 mm, and particularly preferably 0.5 to 2 mm.

(II) Manufacturing of Power Cable 1

The power cable 1 is manufactured by laminating the inner semiconductive layer 12, the insulating layer 13, and the outer semiconductive layer 14 in this order on the outer periphery of the metal conductor 11 by extrusion, and is formed such that the relationship between the cooling rate X [° C./min] at the time of manufacturing the interface portion in the insulating layer 13 with the inner semiconductive layer 12 and the cooling rate Y [° C./min] at the time of manufacturing the central portion of the insulating layer 13 is expressed by the relationship (Z) described below. Note that a configuration in which the above-described shielding layer and sheath (not illustrated in FIG. 1) are further laminated on the outer periphery of these is common.

As an example of a method for manufacturing the power cable 1 by extrusion, the metal conductor 11 is continuously supplied to a resin extrusion port (not illustrated) from a drum (not illustrated) wound with the metal conductor 11, and the inner semiconductive layer 12, the insulating layer 13, and the outer semiconductive layer 14 are applied at the resin extrusion port. These three layers 12, 13, and 14 may be simultaneously extruded, applied, and laminated, or sequentially applied and laminated.

Note that, in a case where the metal conductor 11 at the time of coating is heated by heat transfer from the resin (including the resin composition; the same applies hereinafter) previously applied, it is preferable to supply the metal conductor 11 to the resin extrusion port in a state where the temperature of the metal conductor 11 is cooled to preferably 1 to 100° C. (more preferably 5 to 100° C.) considering that the cooling rate of the resin in the vicinity of the metal conductor is reduced.

The resins (resin compositions) constituting the inner semiconductive layer 12, the insulating layer 13, and the outer semiconductive layer 14 are laminated by extruding the corresponding resins from a resin extruder to the periphery of the metal conductor 11. The resin temperature during lamination extrusion is preferably equal to or higher than the resin melting point, specifically 110° C. or higher, and preferably 140° C. or higher. In addition, in order to enhance adhesion between resin layers, the temperature is 160° C. or higher, preferably 180° C. or higher, and more preferably 200° C. or higher. Furthermore, the temperature is preferably 270° C. or lower in order to prevent resin sagging during extrusion, and is preferably 240° C. or lower in order to prevent thermal deterioration of the resin.

As a manufacturing line in which the resin (resin composition) used in the manufacturing of the present invention can be used, any of cable manufacturing lines such as a vertical extrusion line (VCV) in which a conductor is supplied in a vertical downward direction, and the conductor is coated with the resin to be cured and cooled, a horizontal extrusion line in which the resin is extruded horizontally to be cured and cooled while keeping the cable horizontal, and a catenary extrusion line (CCV) in which the resin is extruded in an oblique downward direction to be cured and cooled in a catenary curve manner can be used. In a case where the resin used in the manufacturing of the present invention is used in a horizontal extrusion line or a catenary extrusion line in which uneven thickness is susceptible to gravity, the resin used in the manufacturing of the present invention is particularly useful since the occurrence of uneven thickness can be reduced.

(III) Cooling Rates X and Y and Confirmation Method Thereof

In the power cable 1 according to the present invention, the relationship between the cooling rate X [° C./min] at the time of manufacturing the interface portion in the insulating layer 13 with the inner semiconductive layer 12 and the cooling rate Y [° C./min] at the time of manufacturing the central portion of the insulating layer 13 is expressed by the following relationship (Z):

$$X \geq Y \times 0.8 \quad (Z)$$

Figure 2:
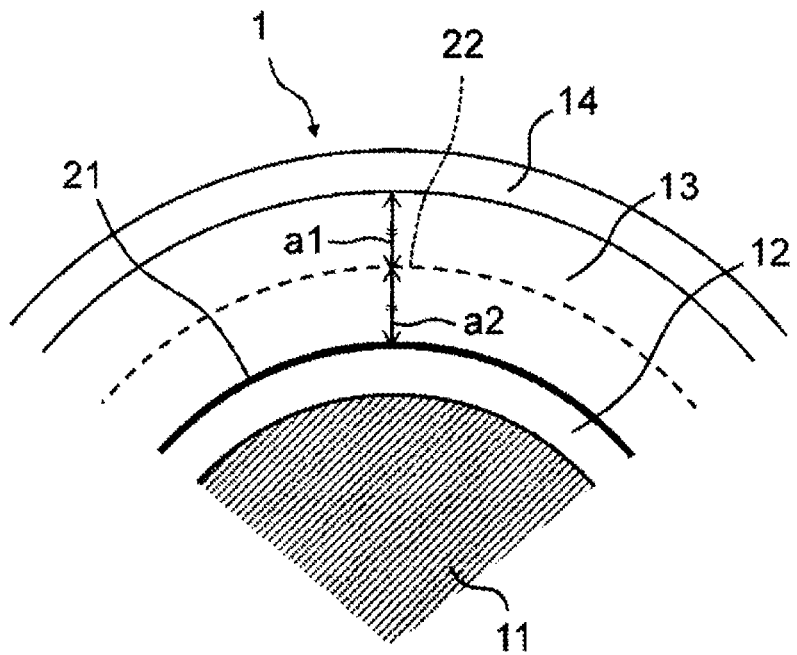
FIG. 2 is an explanatory view illustrating an interface portion in an insulating layer with an inner semiconductive layer and a central portion of the insulating layer.

FIG. 2 is an explanatory view illustrating the interface portion in the insulating layer 13 with the inner semiconductive layer 12 and the central portion of the insulating layer 13. When viewed from the cross section of the power cable 1, the "interface portion in the insulating layer 13 with the inner semiconductive layer 12" refers to a portion closer to the insulating layer 13 than the interface 21 between the inner semiconductive layer 12 and the insulating layer 13 as indicated by a thick line in FIG. 2, and is a portion within about 1 mm.

In addition, the "central portion of the insulating layer 13" refers to a portion within a range of approximately ±1 mm around the center line 22 dividing the thickness of the insulating layer into ½ as indicated by a dotted line in FIG. 2. Note that, in FIG. 2, the length of the arrow a1 is equal to the length of the arrow a2.

The relationship (Z) indicates that the cooling rate X at the time of manufacturing the interface portion in the insulating layer 13 with the inner semiconductive layer 12 (closer to the inner side than the central portion of the insulating layer 13 and closer to the metal conductor 11) is 80% or more of the cooling rate Y at the time of manufacturing the central portion of the insulating layer 13. As a result, even in a case where cooling and solidification of each layer is performed by external cooling for cooling from the outside of the power cable 1, the interface portion in the insulating layer 13 with the inner semiconductive layer 12 is reliably cooled, and not only the surface of the insulating layer 13 (which is the interface with the outer semiconductive layer 14) but also the portion on the inner side thereof (which is the side closer to the metal conductor 11) is reliably cooled and solidified.

Therefore, the metal conductor 11 is not displaced from the center of the power cable 1 due to its own weight, and uneven thickness is less likely to occur. In addition, distortion of cooling shrinkage is dispersed, so that occurrence of voids due to shrinkage is considered to be suppressed, and the power cable 1 having good dielectric breakdown strength is obtained.

Note that the relationship between the cooling rate X [° C./min] at the time of manufacturing the interface portion in the insulating layer 13 with the inner semiconductive layer 12 and the cooling rate Y [° C./min] at the time of manufacturing the central portion of the insulating layer is preferably the following relationship (Z'):

$$Y \times 3 \geq Y \geq Y \times 0.8 \quad (Z')$$

In addition, the cooling rate X [° C./min] at the time of manufacturing the interface portion in the insulating layer 13 with the inner semiconductive layer 12 is particularly preferably 0.9 times or more the cooling rate Y [° C./min] at the time of manufacturing the central portion of the insulating layer 13.

In a case where it is difficult to actually measure the cooling rates X and Y [° C./min] serving as parameters, for example, by inserting a thermocouple into the insulating layer 13, the relationship between the cooling rate and the shoulder peak temperature may be determined from the shoulder peak temperature [° C.] measured on the low temperature side at the melting peak observed in the heating process and the cooling rate [° C./min] in cooling after the heating process by using differential scanning calorimetry (DSC) for a target sample collected from the corresponding portion (the interface portion in the insulating layer 13 with the inner semiconductive layer 12 and the central portion of the insulating layer 13), and the cooling rates X and Y may be confirmed from the relationship. A specific confirmation method is described below.

When the melting point of the resin or resin composition constituting the insulating layer 13 in the power cable 1 according to the present invention is measured by heating by DSC, for example, the position of the shoulder peak (which is the shoulder peak temperature) measured on the low temperature side of the melting peak observed within a range of 120 to 200° C. is considered to be correlated with the cooling rate in cooling and solidification from melting immediately before the measurement. In a case where the cooling rate at the time of recrystallization by cooling and solidification of a target to be measured such as a resin is sufficiently low, the crystallizable polymer chain changes into a stable crystal, but in a case where the cooling rate is high, solidification proceeds faster than when the polymer chain is completely folded and crystallized, and a portion that has not become a stable crystal is generated. In a case where the melting point is measured by heating by DSC, this incomplete portion becomes a shoulder peak and appears on the low temperature side of the melting peak.

For that reason, from the calibration curve obtained by taking the logarithm of the cooling rate [° C./min] as the horizontal axis and the shoulder peak temperature [° C.] as the vertical axis, the cooling rate when the resin or the like constituting the insulating layer 13 at the time of manufacturing the power cable 1 is cooled and solidified at the crystallization temperature can be obtained.

First, a sample of a portion corresponding to the above-described portion (the interface portion or the central portion) illustrated in FIG. 2 in the power cable 1 is collected (target sample).

(1) For the target sample, for example, the shoulder peak temperature in the heating process of 120 to 200° C. (hereinafter simply referred to as a "heating process") is confirmed by DSC. The melting point can be confirmed by such a heating process.

(2) After the heating process, the target sample is cooled at a predetermined cooling rate (for example, 1° C./min) to be cooled and solidified. The cooled and solidified target sample is subjected to a second melting point measurement, and the shoulder peak temperature in the heating process at the time of the melting point measurement is confirmed. According to this operation, the shoulder peak temperature in the case where the cooling rate is 1° C./min is confirmed.

(3) The cooling rate is changed (for example, changed from 1° C./min to 3° C./min), cooling is performed, a third melting point measurement is performed, and the shoulder peak temperature in the heating process at the time of the melting point measurement is confirmed. According to this operation, the shoulder peak temperature in the case where the cooling rate is 3° C./min can be confirmed.

(4) The operation of (3) is repeated, and the shoulder peak temperatures of predetermined cooling rates (for example, 10° C./min, 20° C./min, and the like) and in the heating processes at the time of the subsequent melting point measurements are confirmed (the shoulder peak temperatures in the cases of 1° C./min, 3° C./min, 10° C./min, and 20° C./min are confirmed). Note that the heating rate (for example, 10° C./min) in the heating process is not changed in the operations (1) to (4) and is constant.

Figure 3:
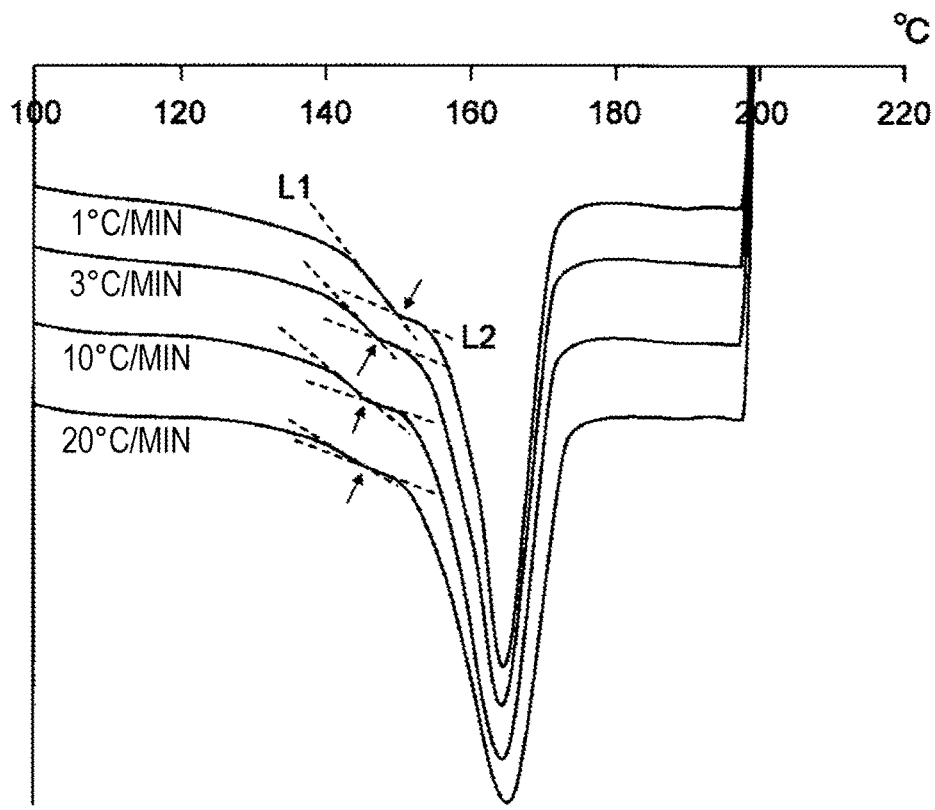
FIG. 3 is a diagram illustrating an example of measurement of shoulder peak temperatures.

FIG. 3 is a diagram illustrating an example of a confirmation method of shoulder peak temperatures. FIG. 3 illustrates melting curves measured at cooling rates of 1° C./min, 3° C./min, 10° C./min, and 20° C./min in accordance with the operations (2) to (4).

The shoulder peak temperature is preferably determined as in the following (i) and (ii) with reference to JIS K 7121 (Testing Methods for Transition Temperatures of Plastics).

(i) The shoulder peak temperature (Ts) [° C.] is a temperature at the vertex of the shoulder peak.

(ii) In a case where the shoulder peak temperature (Ts) [° C.] is gentle and it is difficult to determine the vertex, the temperature is defined as the temperature at the intersection of the tangent drawn at the point where the gradient is maximum in the curve on the low temperature side of the shoulder peak and the tangent drawn at the point where the gradient is minimum in the curve on the high temperature side of the shoulder peak.

FIG. 3 illustrates an example in which tangents are drawn in this manner. For example, in the melting curve with the cooling rate of 1° C./min, the shoulder peak temperature is a temperature (about 150.9° C.) at the intersection of the tangent L1 drawn at the point where the gradient is maximum in the curve on the low temperature side of the shoulder peak and the tangent L2 drawn at the point where the gradient is minimum in the curve on the high temperature side of the shoulder peak (the point indicated by the arrow). The same applies to those with the cooling rates of 3° C./min, 10° C./min, and 20° C./min.

Figure 4:
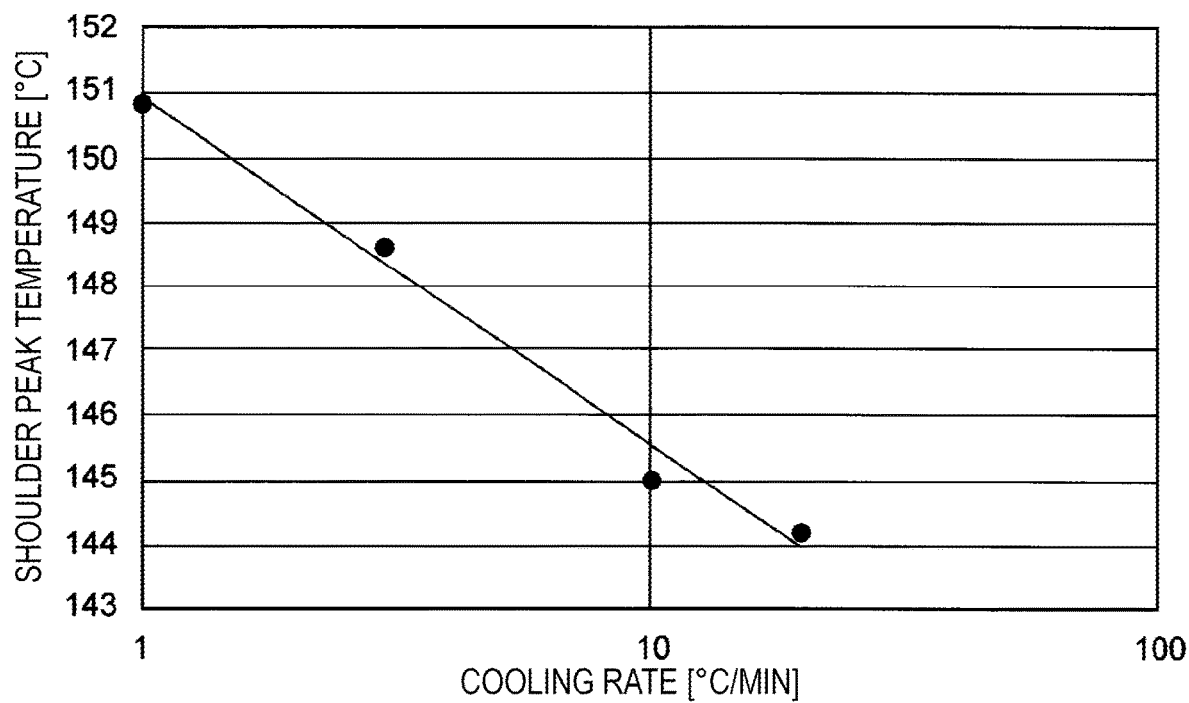
FIG. 4 is a diagram illustrating an example of a relationship between cooling rates and shoulder peak temperatures.

(5) The relationships between the cooling rates and the shoulder peak temperatures obtained in (2) to (4) are plotted with the shoulder peak temperature [° C.] (vertical axis) with respect to the logarithm (horizontal axis) of the cooling rate [° C./min] to prepare a calibration curve (which is generally a linear function (straight line)). FIG. 4 is a diagram illustrating an example of the relationship between the cooling rates and the shoulder peak temperatures.

(6) Then, the shoulder peak temperature confirmed in (1) is applied to the prepared calibration curve to obtain the corresponding cooling rate. The obtained cooling rate is estimated as the cooling rate at the time of manufacturing the target sample.

Note that the temperature range in the heating process is not particularly limited, and can be widely used from the range of 0 to 200° C. However, for example, reading the melting peak from 120 to 200° C. as described above is preferable since the melting point of the propylene-based resin can be reliably covered, and the peak in a case where a resin having a melting point of less than 110° C. is added can be eliminated.

In addition, the cooling rate Y at the time of manufacturing the central portion of the insulating layer 13 is preferably about 0.05 to 40° C./min, and more preferably 0.1 to 30° C./min. When the cooling rate Y is in such a range, the dielectric breakdown strength (insulation performance) is reliably improved. On the other hand, when the cooling rate Y is lower than 0.1° C./min, the cooling efficiency can be poor, leading to slight uneven thickness. When the cooling rate Y is higher than 30° C./min, cooling and solidification may proceed excessively fast, and minute voids due to stress distortion may be partially generated. The cooling rate Y is particularly preferably 0.1 to 15° C./min.

On the other hand, the cooling rate X at the time of manufacturing the interface portion in the insulating layer 13 with the inner semiconductive layer 12 is preferably about 0.04 to 40° C./min, and particularly preferably 0.1 to 30° C./min.

(IV) Effects of Invention

The power cable 1 according to the present invention contains a propylene-based resin in a specific range as the insulating layer 13, and has a specific relationship between the cooling rate X at the time of manufacturing the interface portion in the insulating layer 13 with the inner semiconductive layer 12 and the cooling rate Y at the time of manufacturing the central portion of the insulating layer 13. Thus, not only the surface of the insulating layer 13 but also the inside of the insulating layer 13, the interface portion in the insulating layer 13 with the inner semiconductive layer 12, and the inside thereof are reliably cooled and cured. Therefore, the metal conductor 11 is not displaced from the center of the power cable 1 due to its own weight, and uneven thickness is less likely to occur. In addition, distortion of cooling shrinkage is dispersed, so that occurrence of voids due to shrinkage is suppressed, and the power cable 1 having good dielectric breakdown strength is obtained.

In addition, the method for manufacturing the power cable 1 according to the present invention can provide the power cable 1 having the above effects.

(V) MODIFICATIONS OF EMBODIMENT

Note that the aspects described above illustrate one aspect of the present invention, and the present invention is not limited to the above-described embodiments. Needless to say, modifications and improvements having the configuration of the present invention and within the scope in which the object and the effects can be achieved are included in the contents of the present invention. In addition, the specific structures, shapes, and the like in carrying out the present invention can be other structures, shapes, and the like within the scope of achieving the object and the effects of the present invention. The present invention is not limited to the above-described embodiments, and modifications and improvements within the scope of achieving the object of the present invention are included in the present invention.

For example, in the above (III), an example is described in which four conditions of 1° C./min, 3° C./min, 10° C./min, and 20° C./min are used as the cooling rates of DSC. However, since the cooling rates of DSC are selected for the sake of convenience in order to obtain the relationships illustrated as an example in FIG. 4, the conditions of the cooling rates used in the measurements of DSC and the number of conditions can be arbitrarily determined.

In addition, the specific structures, shapes, and the like in carrying out the present invention can be other structures and the like within the scope of achieving the object of the present invention.

EXAMPLES

Hereinafter, the present invention will be described in more detail based on Examples and Comparative Examples, but the present invention is not limited thereto.

EXAMPLE 1

Manufacturing of Power Cable:

A power cable having the structure illustrated in FIG. 1, in which an inner semiconductive layer, an insulating layer, and an outer semiconductive layer were laminated in this order on the outer periphery of a metal conductor, was manufactured by using the following materials and methods.

Using a copper conductor of hard-drawn copper stranded conductors of JIS C 3105 (the number of strands/strand diameter: 19 wires/2.6 mm, cross-sectional area: 100 mm$^2$) as a metal conductor, and a later-described resin A (Hifax CA 10 A) as a constituent material of an insulating layer, which was extruded with a single screw extruder (L/D=24, 200° C., full flight screw) and extruded with another single screw extruder (L/D=24, 200° C., full flight screw), the outer periphery of the copper conductor was coated with a three-layer head (200° C.) with the resin constituting an inner semiconductive layer and an outer semiconductive layer as shown in Table 1, and. After coating, the power cable of Example 1 was manufactured by passing through a pressurized cooling tube to cool (air cooling), and then being sent to a cooling water tank to cool(cooling).

The manufactured power cable was configured such that the cross-sectional area of the copper conductor was 100 mm$^2$, the thickness of the inner semiconductive layer was 0.5 mm, the thickness of the insulating layer was 10 mm, and the thickness of the outer semiconductive layer was 0.5 mm. The constituent materials of the inner semiconductive layer and the outer semiconductive layer (which may be referred to as the "semiconductive layer" hereinafter) are shown in Table 1.

(Composition of Semiconductive Layer)

TABLE 1

|  | Mass parts |
|---|---|
| EV450 (ethylene-vinyl acetate copolymer) (a) | 70 |
| Adflex Q200F (thermoplastic olefinic elastomer) (b) | 30 |
| DENKA BLACK (carbon black) | 30 |
| NOCRAC 300 (anti-aging agent) | 0.4 |

(Note)
Total of 100 mass parts of (a) and (b) (both thermoplastic resins)

As the semiconductive layer (the inner semiconductive layer and the outer semiconductive layer), a resin composition having a composition shown in Table 1 dry-blended with a Henschel mixer, then kneaded and extruded with a commercially available single screw extruder (L/D=24, 200° C.), and pelletized was used. Specifically, the following resins and the like were used.

(Resins Constituting Semiconductive Layer)

EV450 (ethylene-vinyl acetate copolymer (EVA), manufactured by Dow-Mitsui Polychemicals Co., Ltd.)

Adflex Q 200 F (thermoplastic elastomer (thermoplastic olefinic elastomer) composed of a propylene-α-olefin copolymer, which is a resin obtained by multi-stage gas phase polymerization, and polypropylene, manufactured by SunAllomer Ltd., MFR: 0.8 g/10 min (230° C.), melting point: 162° C.)

DENKA BLACK (carbon black, manufactured by Denka Company Limited)

NOCRAC 300 (anti-aging agent, manufactured by Ouchi Shinko Chemical Industrial Co., Ltd.)

EXAMPLES 2 TO 8

Power cables of Examples 2 to 8 were manufactured in a similar manner to the contents described in Example 1 except that the resin constituting the insulating layer in Example 1 was changed from the resin A to the resin or the resin composition shown in Table 2 (Example 2 and Example 3 are common to Example 1), and the cooling rate was changed by adjusting the supply rate of the copper conductor as the metal conductor and the water temperature of the cooling water tank for water cooling in each Example. Note that, in Examples 2 and 4, water cooling was not performed, and only air cooling was performed.

COMPARATIVE EXAMPLE 1

A power cable of Comparative Example 1 was manufactured in a similar manner to the contents described in Example 1 except that the cooling rate was changed by adjusting the supply rate of the copper conductor as the metal conductor and the water temperature of the cooling water tank in Example 1.

In addition, the insulating layer was made of the following resins or a resin composition obtained by mixing the following resins as constituent materials. Note that the resin A and the resin B correspond to propylene-based resins.

(Resin A)

Hifax CA 10 A (thermoplastic elastomer (thermoplastic olefinic elastomer) composed of 65 mass % of an ethylene-propylene copolymer, which is a resin obtained by multi-stage gas phase polymerization, and polypropylene, manufactured by LyondellBasell Industries N.V., MFR 0.6 g/10 min (230° C.), melting point 145° C.)

(Resin B)

Adflex Q 200 F (thermoplastic elastomer (thermoplastic olefinic elastomer) composed of a propylene-α-olefin copolymer, which is a resin obtained by multi-stage gas phase polymerization, and polypropylene, manufactured by SunAllomer Ltd., MFR: 0.8 g/10 min (230° C.), melting point: 162° C.)

(Resin C)

Tuftec H1041 (hydrogenated thermoplastic styrenic elastomer (SEBS), manufactured by Asahi Kasei Corporation, MFR 5.0 g/10 min (230° C.), melting point 86° C.)

(Resin D)

TAFMER BL3110M (ethylene-butene copolymer, manufactured by Mitsui Chemicals, Inc., MFR 3 g/10 min (190° C.), melting point 108° C.)

TEST EXAMPLE 1

Lightning Impulse Test:

For the power cable manufactured as described above, a lightning impulse test was performed at a test temperature of 90° C. according to JIS C 3005. Note that, in the lightning impulse test, a case where the voltage was 170 kV/mm or more was regarded as pass, and a case where the voltage was less than 170 kV/mm was regarded as fail.

Note that the measurement of the lightning impulse test is a test (dielectric breakdown test) for confirming the electrical breakdown level (dielectric breakdown strength) of the insulating layer, and if the lightning impulse test is good, it is considered that there is no uneven thickness in the insulating layer, and voids, peeling, and the like due to shrinkage do not occur.

(Measurement of Cooling Rate and Confirmation of Cooling Rate at the Time of Manufacturing)

With respect to the sampling in the measurement of the cooling rate, about 100 mg of a target sample was collected from each of the "interface portion in the insulating layer with the inner semiconductive layer" and the "central portion of the insulating layer" corresponding to the portions illustrated in FIG. 2 for the power cables of Examples 1 to 8 and Comparative Example 1.

The measurement was performed by using a commercially available DSC apparatus (DSC7020AS-3D, manufactured by Hitachi High-Tech Science Corporation). The rate of heating was 10° C./min, and the temperature cycle range was 0 to 200° C.

Then, according to the confirmation method described in "(III) cooling rates X and Y and confirmation method thereof", after DSC measurement of the target sample, a calibration curve was subsequently prepared by using this sample. Regarding the cooling rate [° C./min] of DSC, heating and cooling were repeated at 3, 5, 10, and 20° C./min for 1, 3, 10, and 20° C./min in (III), and the shoulder peak temperature [° C./min] appearing on the low temperature side of the melting peak with respect to the logarithm of each cooling rate was confirmed, and the relationships as illustrated in FIG. 4 were obtained to prepare a calibration curve. Note that the shoulder peak temperature was determined from the intersection of two tangents to the shoulder as illustrated in (III) (in particular (4) (i) and (ii)) and FIG. 3.

Then, the shoulder peak temperature confirmed in the first melting point measurement was applied to the prepared calibration curve to obtain the corresponding cooling rate, and the cooling rate was taken as the cooling rate at the time of manufacturing the target sample. The results are shown in Table 2 together with the resins (or resin composition) constituting the insulating layer and the like.
(Constituent Materials and Results)

TABLE 2

| | Resins constituting insulating layer [mass %] | | | | Lightning impulse test [kV/mm] | Cooling rate [° C./min] | | |
| --- | --- | --- | --- | --- | --- | --- | --- | --- |
| | A | B | C | D | | Interface portion (X) | Central portion (Y) | Y × 0.8 |
| Example 1 | 100 | — | — | — | 197 | 8 | 10 | 8 |
| Example 2 | 100 | — | — | — | 199 | 0.1 | 0.1 | 0.08 |
| Example 3 | 100 | — | — | — | 200 | 27 | 30 | 24 |
| Example 4 | — | 100 | — | — | 177 | 0.04 | 0.05 | 0.04 |
| Example 5 | — | 100 | — | — | 175 | 40 | 35 | 28 |
| Example 6 | — | 25 | 75 | — | 195 | 11 | 12 | 9.6 |
| Example 7 | — | 25 | — | 75 | 190 | 12 | 11 | 8.8 |
| Example 8 | — | 20 | 80 | — | 170 | 10 | 12 | 9.6 |
| Comparative Example 1 | 100 | — | — | — | 160 | 7 | 10 | 8 |

As shown in Table 2, in Examples 1 to 8 in which the relationship between the cooling rate X [° C./min] at the time of manufacturing the interface portion in the insulating layer with the inner semiconductive layer and the cooling rate Y [° C./min] at the time of manufacturing the central portion of the insulating layer had the relationship of the following relationship (Z), it could be confirmed that all the results of the lightning impulse test were pass and the dielectric breakdown characteristics were good.

Note that, in Examples 4 and 5, the cooling rate Y at the time of manufacturing the central portion in the insulating layer was out of the range of 0.1 to 30° C./min, which was worse than the results of Examples 1 to 3. In addition, in Example 8, the content of the resin C (hydrogenated thermoplastic styrenic elastomer) was larger than that in Example 6 having a similar configuration, and the content of the propylene-based resin (resin B) was accordingly smaller, and thus the result was worse than that in Example 6.

On the other hand, in Comparative Example 1, since the cooling rate X at the time of manufacturing the interface portion is lower than the cooling rate Y at the time of manufacturing the central portion, the relationship of the relationship (Z) is not satisfied. As a result, the result of the lightning impulse test was less than 170 kV/mm and failed. In a case where the cooling rate has a relationship as in Comparative Example 1, it is considered that "shrinkage" occurs in the insulating layer, and the dielectric breakdown characteristics (insulation characteristics) are deteriorated.

INDUSTRIAL APPLICABILITY

The present invention can be used as a means for easily providing a power cable and a method for manufacturing a power cable having good dielectric breakdown strength (insulation characteristics), and has high industrial applicability.

REFERENCE SIGNS LIST

1 Power cable
11 Metal conductor
12 Inner semiconductive layer
13 Insulating layer
14 Outer semiconductive layer
21 Interface
22 Center line
a1, a2 Arrow
L1, L2 Tangent

What is claimed is:

1. A power cable having a structure in which an inner semiconductive layer, an insulating layer, and an outer semiconductive layer are laminated in this order on an outer periphery of a metal conductor, wherein
the insulating layer contains 15 mass % or more of a propylene-based resin having a melting point of 110° C. or higher with respect to a whole, and
a relationship between a cooling rate X [° C./min] at a time of manufacturing an interface portion in the insulating layer with the inner semiconductive layer and a cooling rate Y [° C./min] at a time of manufacturing a central portion of the insulating layer is expressed by a following relationship (Z):

$$X \geq Y \times 0.8 \tag{Z}$$

2. The power cable according to claim 1, wherein the propylene-based resin is obtained by multi-stage gas phase polymerization.

3. The power cable according to claim 1, wherein the propylene-based resin is a thermoplastic olefinic elastomer.

4. The power cable according to claim 1, wherein the insulating layer contains a thermoplastic resin having a melting point of less than 110° C. in a range of more than 0 to 75 mass % or less with respect to the entire insulating layer.

5. The power cable according to claim 1, wherein a relationship between a cooling rate and a shoulder peak temperature is obtained from the shoulder peak temperature [° C.] measured on a low temperature side at a melting peak observed in a heating process and the cooling rate [° C./min] in cooling after the heating process by using differential scanning calorimetry (DSC) for a target sample collected from a corresponding portion, and the cooling rate X and the cooling rate Y are confirmed by the relationship.

6. The power cable according to claim 1, wherein the cooling rate Y is 0.1 to 30° C./min.

7. The power cable according to claim 1, wherein a thickness of the insulating layer is 5 mm or more.

8. A method for manufacturing a power cable having a structure in which an inner semiconductive layer, an insulating layer, and an outer semiconductive layer are applied and laminated in this order on an outer periphery of a metal conductor by extrusion, wherein the insulating layer contains 15 mass % or more of a propylene-based resin having a melting point of 110° C. or higher with respect to a whole, and the insulating layer is formed such that a relationship between a cooling rate X [° C./min] at a time of manufacturing an interface portion in the insulating layer with the inner semiconductive layer and a cooling rate Y [° C./min] at a time of manufacturing a central portion of the insulating layer is expressed by a following relationship (Z):

$$X \geq Y \times 0.8 \qquad (Z).$$

9. The method for manufacturing a power cable according to claim 8, wherein a relationship between a cooling rate and a shoulder peak temperature is obtained from the shoulder peak temperature [° C.] measured on a low temperature side at a melting peak observed in a heating process and the cooling rate [° C./min] in cooling after the heating process by using differential scanning calorimetry (DSC) for a target sample collected from a corresponding portion, and the cooling rate X and the cooling rate Y are confirmed by the relationship.

\* \* \* \* \*